United States Patent
Mitchell et al.

(10) Patent No.: US 10,345,177 B2
(45) Date of Patent: Jul. 9, 2019

(54) SENSOR CARTRIDGE FOR MOUNTING IN A RESERVOIR

(71) Applicant: Ford Global Technologies, LLC, Dearborn, MI (US)

(72) Inventors: Robert Alex Mitchell, Plymouth, MI (US); Michael Joseph Giunta, Livonia, MI (US); Joshua Putman Styron, Canton, MI (US); Jeanette Madej, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/499,264

(22) Filed: Apr. 27, 2017

(65) Prior Publication Data

US 2018/0313710 A1    Nov. 1, 2018

(51) Int. Cl.
  *G01L 19/04* (2006.01)
  *G01L 19/14* (2006.01)
  *F01P 11/02* (2006.01)

(52) U.S. Cl.
  CPC ............ *G01L 19/04* (2013.01); *G01L 19/147* (2013.01); *F01P 2011/0219* (2013.01)

(58) Field of Classification Search
  None
  See application file for complete search history.

(56) References Cited

U.S. PATENT DOCUMENTS

| | | | | |
|---|---|---|---|---|
| 4,771,916 A | * | 9/1988 | Mitchell | B67B 7/26 222/533 |
| 5,234,038 A | * | 8/1993 | Mitchell | B67D 7/54 141/291 |
| 6,532,650 B1 | * | 3/2003 | Kirchdoerffer | G01D 11/245 29/592.1 |
| 6,835,304 B2 | | 12/2004 | Jousset | |
| 7,559,247 B2 | * | 7/2009 | Otsuka | G01L 9/0055 361/283.4 |
| 9,091,609 B2 | * | 7/2015 | Micai | G01L 19/149 |
| 2004/0050170 A1 | * | 3/2004 | Koch | B60C 23/0493 73/756 |
| 2006/0283244 A1 | * | 12/2006 | Schonlau | B60T 17/225 73/291 |
| 2010/0040112 A1 | | 2/2010 | Huck | |
| 2014/0208847 A1 | | 7/2014 | Baranov | |

\* cited by examiner

*Primary Examiner* — Peter J Macchiarolo
*Assistant Examiner* — Jermaine L Jenkins
(74) *Attorney, Agent, or Firm* — Diana D. Brehob; Brehob Law, PLLC; Gregory P. Brown

(57) ABSTRACT

Sensors are provided in reservoirs on internal combustion engines, and other applications, in which the reservoir is subjected to variations in pressure and temperature that cause the reservoir to exert variable forces on the sensor, thereby affecting sensor accuracy. To overcome problems in the prior art, a reservoir and sensor cartridge system are disclosing having: a reservoir with first and second openings, a cap coupled to the first opening, and a sensor cartridge disposed in the second opening. The sensor cartridge includes a sensor disposed in a body, a circumferential indentation formed in an outer surface of the body, a seal disposed in the indentation, and a retention feature provided on the body's outer surface. The circumferential indentation with the seal is axially displaced along the body from the sensor.

11 Claims, 2 Drawing Sheets

SENSOR CARTRIDGE FOR MOUNTING IN A RESERVOIR

FIELD

The present disclosure relates to sensors mounted in reservoirs.

BACKGROUND

A coolant system for an internal combustion engine includes a coolant overflow tank or expansion reservoir to hold contain coolant that has expanded during hot operation. It is common to fabricate such reservoirs from plastic. Some reservoirs are provided a sensor, such as a level sensor or a pressure sensor. The engine coolant system is pressurized and coolant temperature can vary from ambient temperature at cold start, which could be well below freezing, to about 100 degrees C. The structural characteristics of the plastic varies over such a temperature range.

Referring to FIG. 1, a reservoir 10 has a cap 12, an opening 14 that communicates with other portions of a coolant system, a mounting tab 16, a sensor 18 with the connector visible, and a sensor 20, which has a cord 22 extending from it with a connector 24. Sensors 18 and 20 may be pressure and fluid level sensors, as examples. When the plastic of reservoir 10 expands or contracts due to changes in temperature, a tensile or compressive force may be applied to the sensors. Such forces can negatively impact the sensor's output signal thereby reducing accuracy. One way to prevent such inaccuracies would be to increase the thickness of the material used in fabricating the reservoir or to use more expensive material that is tougher. However, this increases cost and weight of the reservoir. A sensor mount that prevents the distortion of the reservoir due to pressure and temperature variations to transmit forces confounding the signal is desired.

SUMMARY

To overcome at least one problem in the prior art, a sensor cartridge is disclosed that has a substantially cylindrical body having an inner end and an outer end, a sensor disposed in the body with electrical leads of the sensor extending through the outer end, a retention features provide on the outer surface of the body, a circumferential indentation formed in an outer surface of the body, and a seal disposed in the circumferential indentation wherein the seal is axially displaced from the sensor location within the body. In some embodiments, the seal is an O-ring.

The sensor is a pressure sensor in some instance. The body has a cavity in which the pressure sensor is disposed. The cavity is located at the inner end of the body. The inner end of the body is adapted to be inserted into an opening in a reservoir.

The retention feature is a circumferential bump extending radially outwardly from the body.

The retention feature is a circumferential groove defined in the outer surface of the body.

Also disclosed is a reservoir and sensor cartridge system having a reservoir with an opening and a sensor disposed in the opening. The sensor cartridge has a body with inner end and an outer end, a sensor disposed in the body, a circumferential indentation formed in an outer surface of the body, a seal disposed in the indentation, and a retention feature provided on the body's outer surface.

The reservoir has a sensor cartridge acceptor wall proximate the opening. An inner surface of the cartridge acceptor wall has a retention feature that mates with the retention feature on the body of the sensor cartridge when the sensor cartridge is installed in the reservoir.

The retention feature on the body is a circumferential ridge and the retention feature on the sensor cartridge acceptor wall is a groove.

In some embodiments, the retention features on the body and the sensor cartridge are a bayonet fitting.

The seal is proximate the location where the sensor acceptance wall extends outwardly from the reservoir with the reservoir thereby providing resistance to the seal.

The sensor is mounted in the sensor cartridge at an axial location away from the seal and away from the retention feature.

The sensor is coupled to electrical leads that extend through the outer end of the sensor cartridge.

A reservoir and sensor cartridge system, according to an embodiment of the disclosures has a reservoir having first and second openings, a cap coupled to the first opening, and a sensor cartridge disposed in the second opening. The sensor cartridge includes: a sensor disposed in a substantially-cylindrical sensor body, a circumferential indentation formed in an outer surface of the sensor body, a seal disposed in the indentation, and a retention feature provided on the sensor body's outer surface.

The reservoir has a sensor cartridge acceptor wall proximate the second opening and the sensor cartridge acceptor wall includes a retention feature that mates with the retention feature of the sensor body of the sensor cartridge.

The sensor is axially displaced with respect to the seal on the sensor body of the sensor cartridge.

The sensor is axially displaced with respect to the retention feature on the body of the sensor cartridge.

The body of the sensor cartridge has an inner end that extends into the reservoir and an outer end that is distal from the reservoir. The sensor is disposed in the inner end of the body.

The sensor has leads coupled thereto; and the leads run through the body and exit from the outer end of the body.

By providing a sealing feature that is displaced from the sensor, forces are not transmitted to the sensor itself. Thus, the reading for the sensor is not affected by changes in the reservoir's structural characteristics due to variation in temperature and pressure. This result is accomplished without other alterations to the reservoir, such as increasing thickness or selecting a more expensive material, that would increase cost and/or weight.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
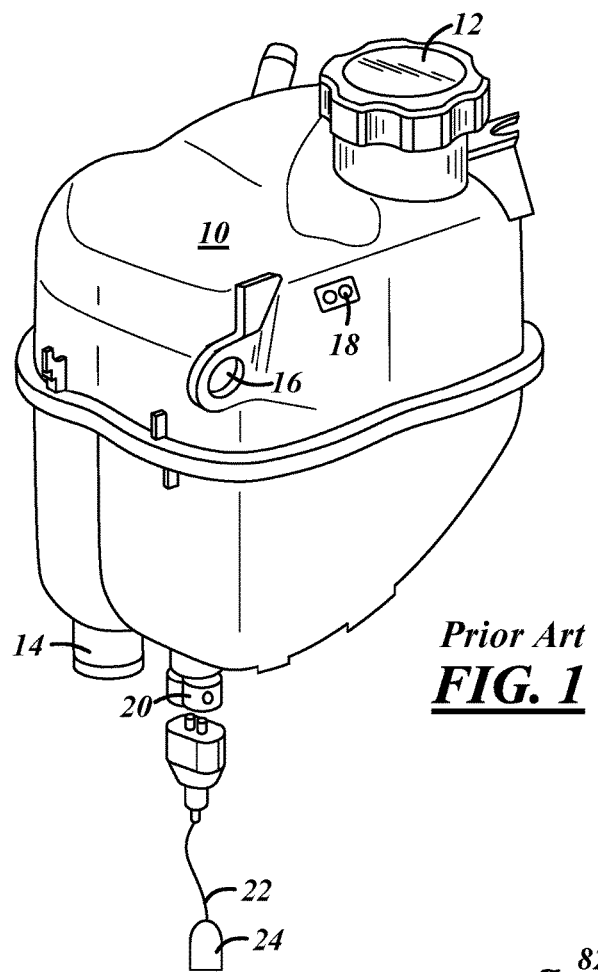
FIG. 1 is an illustration of sensors mounted in a reservoir.
Figure 2:
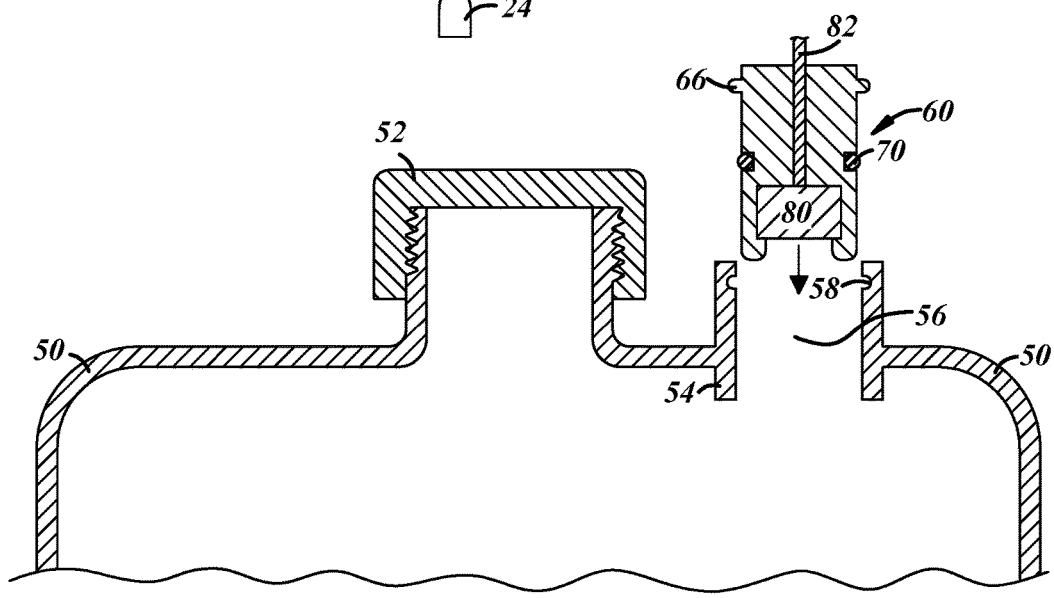
FIG. 2 is an illustration of a portion of a reservoir having an opening for a sensor cartridge showing the sensor cartridge prior to insertion.

In FIG. 2, a top portion of a reservoir 50 is shown in cross section. An opening in the top of reservoir 50 is covered with a threaded, sealing cap 52. A cartridge opening 56 is also provided in reservoir 50 with a cartridge acceptor wall 54 surrounding opening 56. Cartridge acceptor wall 54 contains a retaining feature 58, which in this embodiment is a circumferential groove on the inner surface of cartridge acceptor wall 54. In alternative embodiments, the retaining feature is a clip, a bayonet closure, or any suitable element.

A sensor cartridge 60 is shown in FIG. 2 prior to installation into cartridge retaining walls 54 of reservoir 50. Sensor cartridge 60 captures a sensor 80 within an inner end of sensor cartridge 60, inner end referring to the position of the end with the sensor when mounted in the reservoir. When sensor cartridge 60 is made of plastic, sensor cartridge can be molded over sensor 80 for retention. Alternatively, any suitable sensor retaining element may be used. Sensor 80 has a sensor leads 82 coupled thereto. Leads 80 extend out of an outer end of sensor cartridge 60. Leads 80 may have a connector (not shown) that couples to the electronic control unit (also not shown). Sensor cartridge 60 is generally cylindrical with a circumferential groove in the outer surface. An O-ring 70 is placed in the circumferential groove. In addition, a circumferential bump 66, a retaining feature, extends outwardly from the outer surface of sensor cartridge 60. Any suitable retaining feature that mates with the retaining feature 58 of cartridge acceptor wall 54 can be used in place of circumferential bump 66.

Figure 3:
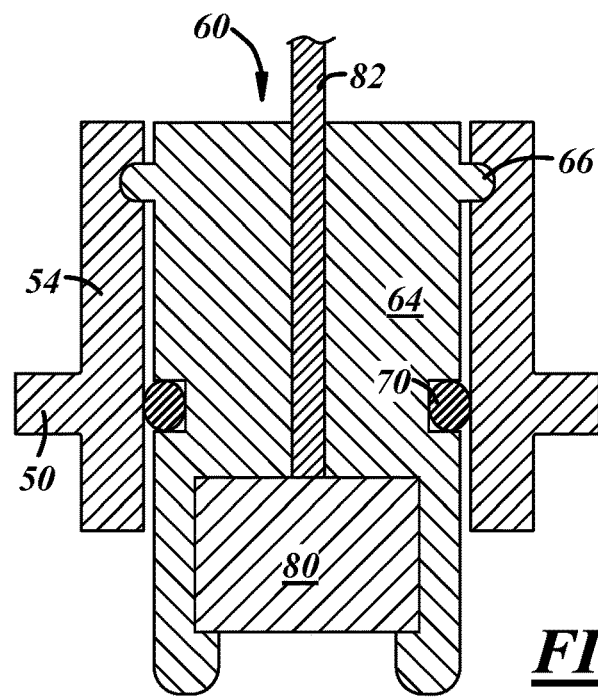
FIG. 3 is a portion of the reservoir in FIG. 2 with the sensor cartridge installed.
Figure 4:
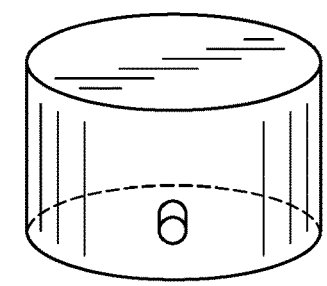
FIG. 4 is a bayonet fitting, one embodiment for a retention feature.
Figure 4:
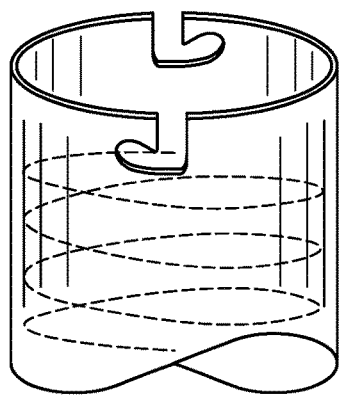

In FIG. 3, sensor cartridge 60 is shown inserted into cartridge acceptor wall 54 of reservoir 50. O-ring 70 is deformed thereby providing a seal between sensor cartridge 60 and the inner surface of cartridge acceptor wall 54. Depending on the pressure or vacuum expected within reservoir 50, additional O-rings, or other seals, may be provided between the inner surface of cartridge acceptor wall 54 and the substantially cylindrical surface of sensor cartridge 60. Retaining feature 66 of sensor cartridge 60 mates with the groove (not separately visible in FIG. 3) of cartridge acceptor wall 54.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A reservoir and sensor cartridge system, comprising:
a reservoir having an opening; and
a sensor cartridge disposed in the opening and having:
    a body with an inner end and an outer end;
    a sensor disposed in the body;
    a circumferential indentation formed in an outer surface of the body;
    a seal disposed in the indentation; and
    a body retention feature provided on the body's outer surface wherein:
        the reservoir has a sensor cartridge acceptor wall proximate the opening; and
        an inner surface of the cartridge acceptor wall has a reservoir retention feature that mates with the body retention feature of the sensor cartridge when the sensor cartridge is installed in the reservoir.

2. The system of claim 1 wherein:
the body retention feature is a circumferential ridge; and
the reservoir retention feature on the sensor cartridge acceptor wall is a groove.

3. The system of claim 1 wherein: the body retention feature and the reservoir retention feature comprise a bayonet fitting.

4. The system of claim 1 wherein the seal is proximate the location where the sensor acceptance wall extends outwardly from the reservoir with the reservoir thereby providing resistance to the seal.

5. The system of claim 1 wherein the sensor is mounted in the sensor cartridge at an axial location away from the seal and away from the body retention feature.

6. The system of claim 1 wherein the sensor is coupled to electrical leads that extend through the outer end of the sensor cartridge.

7. A reservoir and sensor cartridge system, comprising:
a reservoir having first and second openings;
a cap coupled to the first opening; and
a sensor cartridge disposed in the second opening, the sensor cartridge having:
    a sensor disposed in a substantially-cylindrical sensor body;
    a circumferential indentation formed in an outer surface of the sensor body;
    a seal disposed in the indentation; and
a body retention feature provided on the sensor body's outer surface, wherein:
    the reservoir has a sensor cartridge acceptor wall proximate the second opening; and
    the sensor cartridge acceptor wall includes a reservoir retention feature that mates with the retention feature of the body of the sensor cartridge.

8. The reservoir and sensor cartridge system of claim 7 wherein the sensor is axially displaced with respect to the seal on the sensor body of the sensor cartridge.

9. The reservoir and sensor cartridge system of claim 7 wherein the sensor is axially displaced with respect to the body retention feature of the sensor cartridge.

10. The reservoir and sensor cartridge system of claim 7 wherein:
the body of the sensor cartridge has an inner end that extends into the reservoir and an outer end that is distal from the reservoir; and
the sensor is disposed in the inner end of the sensor body.

11. The reservoir and sensor cartridge system of claim 7 wherein: the sensor has leads coupled thereto; and the leads run through the body and exit from the outer end of the body.

* * * * *